Oct. 24, 1961  E. M. BASINGER  3,005,952
ELECTRICAL INSTRUMENTS AND METHOD OF
ADJUSTING SCALE CHARACTERISTICS
Filed Oct. 6, 1958  3 Sheets-Sheet 2
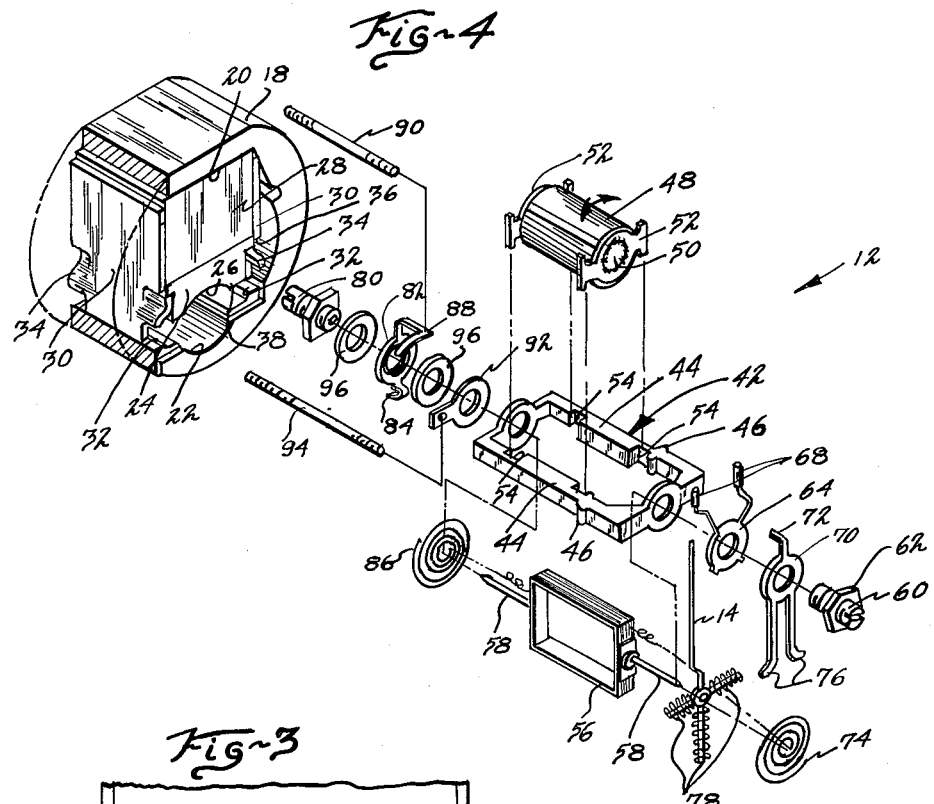
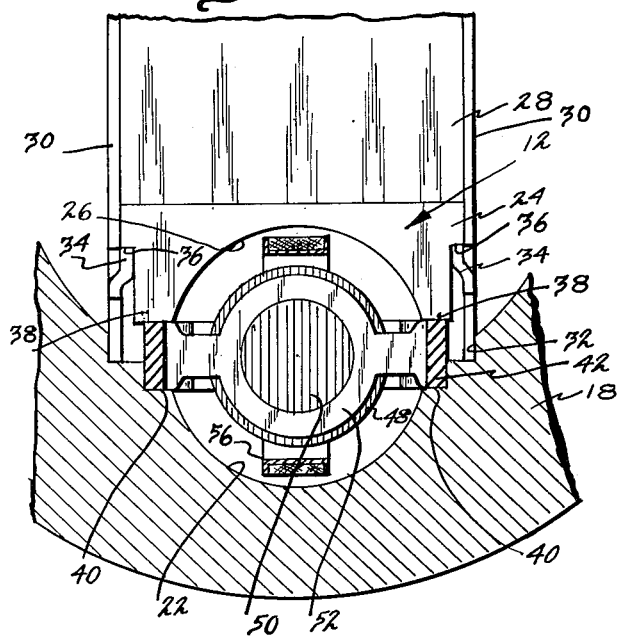
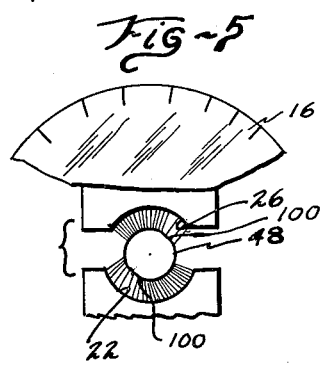
INVENTOR.
EUGENE M. BASINGER
BY Toulmin & Toulmin
ATTORNEYS

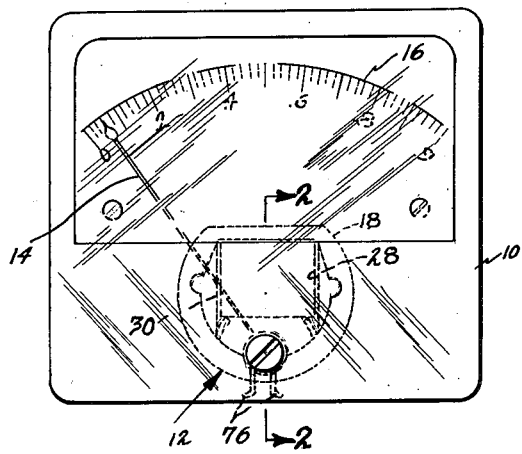
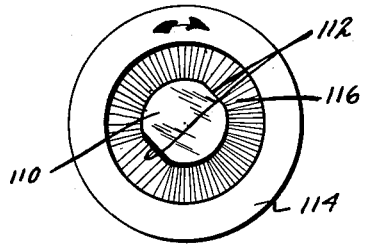
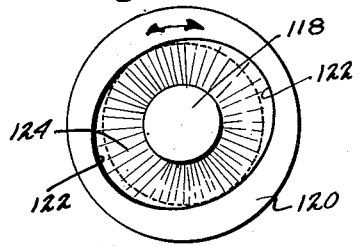
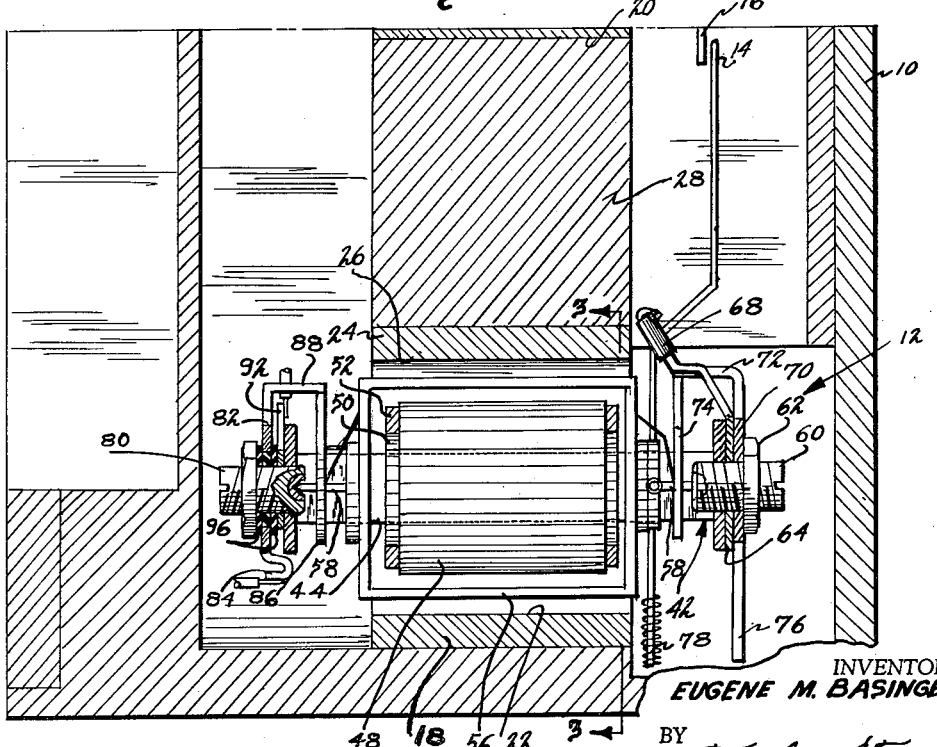

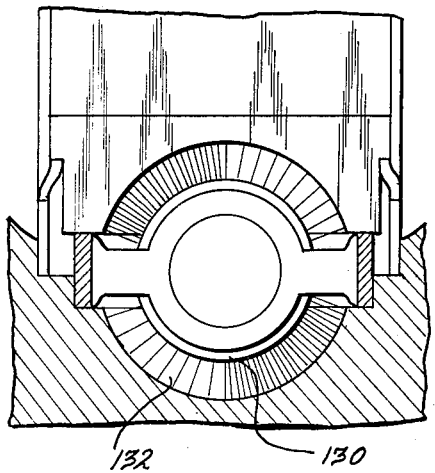
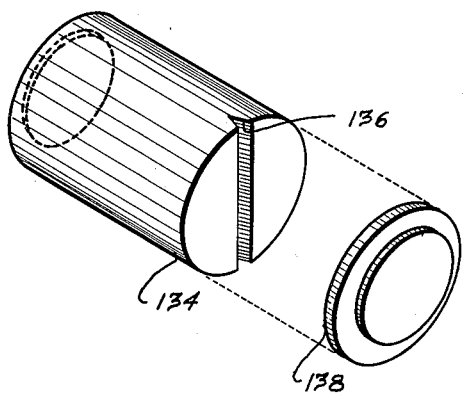
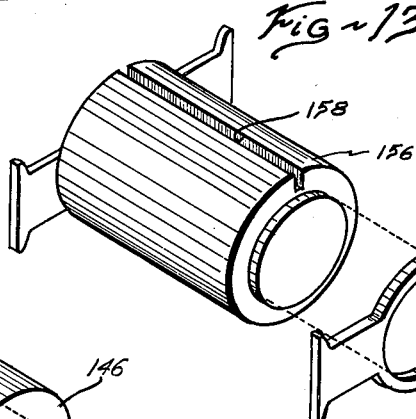
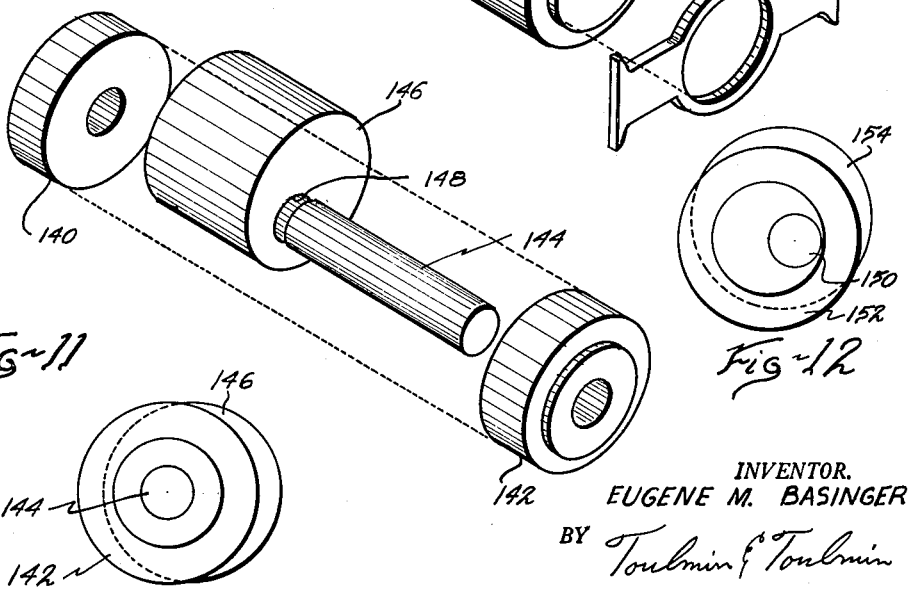
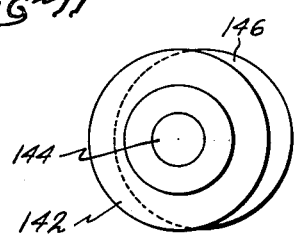
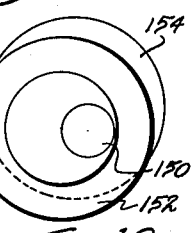
INVENTOR.
EUGENE M. BASINGER United States Patent Office 3,005,952
Patented Oct. 24, 1961

3,005,952
ELECTRICAL INSTRUMENTS AND METHOD OF ADJUSTING SCALE CHARACTERISTICS
Eugene M. Basinger, Bluffton, Ohio, assignor to The Triplett Electrical Instrument Co., Bluffton, Ohio, a corporation of Ohio
Filed Oct. 6, 1958, Ser. No. 765,552
3 Claims. (Cl. 324—151)

This invention relates to electrical instruments as more particularly concerned with instruments of the D'Arsonval type in which there is a magnetic field through which a coil of wire turns when energized.

Instruments of the D'Arsonval moving coil type are well-known and are widely used for both direct current and alternating current measurements, the alternating current measurements being possible when utilizing rectifiers. Since instruments of this type depend on the interaction between electrical current in the moving coil and the stationary fixed field of the magnetic frame of the instrument, it is apparent that the field strength or flux density will influence the deflection of the instrument pointer which is carried by the moving coil. Thus, any change made in the flux distribution in the path along which the coil moves, will result in a change in the indicating characteristics of the instrument.

Heretofore, instruments of this nature have been constructed and assembled from standard carefully machined parts so as to reduce to the smallest possible degree the changes in response of the instrument at various deflections of the moving coil whereby the instruments could be assembled together with a standard scale and would generally fall within predetermined limits of error. However, due to the fact that there are manufacturing tolerances in the machined parts as well as variations and impurities in the materials such as the Alnico alloys, these variations often are cumulative and the instruments may not indicate within the allowable prescribed percentage of full scale deflection, which is the basis for calculating the accuracy of such instruments.

Having the foregoing in mind, it is a primary object of the present invention to provide a type of construction for a D'Arsonval moving coil instrument in which manufacturing variations can be accommodated for at the time of assembling the instrument.

Another object of this invention is to provide an improved magnetic frame structure for a D'Arsonval type instrument which will permit adjustment of the flux distribution along the path through which the moving coil moves at the time of assembling the instrument thereby to provide for a construction wherein the limits of tolerance can be brought within certain predetermined prescribed limits thereby improving the quality of the instrument.

A still further object of this invention is the provision of a magnetic frame construction for a moving coil type of instrument in which any predetermined characteristics can be imparted to the moving part of the instrument thereby to provide for scale having any desired characteristics, such as exact linearity or spread in any desired portion of the scale, such as in the center or at one end.

A still further object of this invention is the provision of a method of constructing and assembling a moving coil type instrument such that relatively unskilled labor can effect adjustments of the magnetic frame of the instrument at the time of assembling thereby to impart to the instrument the desired indicating characteristics.

In general, the foregoing objectives are accomplished by providing, in a magnetic field structure which has heretofore always been manufactured of symmetrical components, at least one part which can be adjusted to provide for asymmetrical field conditions along the path of the moving coil, or which can be adjusted to convert a condition of asymmetry of the field to one of symmetry. This is preferably done, according to the present invention, by providing the core of the magnetic frame, in which the core is a generally cylindrical member, about which the moving coil moves, with one or more flats or other portions which depart from a true cylindrical shape or wherein the core is otherwise distorted from a true symmetrical shape or irregular in any fashion, and so mounting the core that it can be rotated thereby to produce the desired effect which has been described above.

In some instances adjustment of the core above is insufficient to provide the desired scale characteristics. In these cases it is helpful to provide adjustment of a non-symmetrical pole piece or adjustment of both the core and pole piece. Where extreme departures from a linear scale are desired, the movable core is made of a magnetic material in combination with the conventional magnetic assembly so as to purposely distort the generally uniform flux distribution in which the coil moves so that an extremely non-linear scale can be constructed and controlled. Since it is possible to have a non-uniform magnetic flux emitting from a truly symmetrical magnetic core, the magnetic core can in some instances be of a truly symmetrical structure.

The several objects and advantages of the present invention above referred to, as well as other objects and advantages, will become more apparent upon reference to the accompanying drawings in which:

FIGURE 1 is a front elevational view of a conventional moving coil type instrument constructed according to my invention, FIGURE 2 is a vertical section indicated by line 2—2 on FIGURE 1 but drawn at greatly enlarged scale showing details of construction of the instrument, FIGURE 3 is a transverse section indicated by line 3—3 on FIGURE 2 showing the short post formed at the end of the core that rotatably supports the core in the movement frame, FIGURE 4 is an exploded perspective view showing the magnetic frame of the instrument and the various portions of the movement associated with the magnetic frame to make up the basic parts of the indicating instrument, FIGURE 5 is a more or less diagrammatic view showing the magnetic relationship between the core of the magnetic frame and the principal pole faces thereof, FIGURE 6 is a diagrammatic view similar to FIGURE 5 but illustrates an arrangement wherein the core of the magnetic frame is the magnet and the other part of the frame is of soft iron.

FIGURE 7 is a view similar to FIGURE 6 but showing how the asymmetry could be imparted to the outer soft iron portion of an arrangement like FIGURE 6 rather than to the core portion, FIGURE 8 is a fragmentary view illustrating variation in the field strength about the core through asymmetrical magnetization of the core itself, FIGURE 9 is a perspective view of a core having a groove across one end for varying the reluctance of the magnetic path, FIGURE 10 is a perspective view showing a multi-part core with an eccentric portion which is rotatable relative to the core to provide for asymmetrical field conditions, FIGURE 11 is an end view looking in at a core according to FIGURE 10 showing the one possible adjusted position thereof, FIGURE 12 is a view similar to FIGURE 11 but shows an arrangement capable of wider adjustment, and FIGURE 13 is a perspective view showing a core with a simple saw slot therein for obtaining the desired asymmetrical field conditions.

Referring to the drawings somewhat more in detail, the instrument of FIGURE 1 consists of an outer case 10 and mounted therein is an instrument movement generally designated 12 and which comprises a magnetic frame part and a movement portion consisting of a frame that supports the moving coil and to which moving coil is attached an indicating pointer 14 that sweeps over a calibrated dial 16 carried by the instrument case.

FIGURES 2, 3 and 4 will reveal more in detail the exact construction of the instrument. The magnetic frame of the instrument comprises a soft iron ring part 18 having a flat area 20 on the inside at one side, and directly opposite thereto, also on the inside, having an arcuate recess 22. Directly opposite arcuate recess 22 is a soft iron part 24 having a similar recess 26 therein which, together with the recess 22, forms a cylindrical opening completely through the magnetic frame within which the core of the magnetic frame is mounted and within which space the moving coil turns. The surfaces 22 and 26 form the two pole faces and the moving coil has one side adjacent each of the pole faces.

The back of member 24 is flat and between the flat back of this member and the previously mentioned flat surface 20 on the inside of the ring there is positioned the permanent magnet 28 which is preferably and usually one of the oriented Alnico group, such as Alnico V or Alnico VI.

The Alnico magnet 28 and member 24 are located within ring 18 and retained in position therein by plates 30 located on opposite sides of the Alnico magnet and member 24 inside the ring and extending from shoulders 32 formed at opposite sides of recess 22 in the ring upwardly along the said member 24 and the magnet. Tabs 34 are turned in from the side edges of the plates and engage beneath shoulders 36 formed on the under side of member 24. The Alnico magnet fits tightly in the resulting space and when pressed into position tends to hold the plates 30 and the member 24 rigidly in place and fixed in location. Additionally, the magnetic contact of the Alnico magnet with the ring and the member 24 is as intimate as possible thus providing for the most efficient use of the magnet.

Reference to FIGURE 3 will reveal that the member 24 forming one of the pole faces of the magnetic frame has, in addition to the shoulders 36 that are engaged by the tabs 34, legs that terminate in flats 38 at opposite ends of the pole face. These flats are directly opposed to flats 40 formed at the sides of recess 22 that forms the other pole face and the two flats define a channel within which the frame that supports the instrument core and the moving coil can be mounted.

Referring to FIGURES 2, 3 and 4, it will be seen that the frame for the moving coil and the core is a rectangular element 42 which may be die cast and which has side members 44 adapted to fit in the channels referred to above that are formed between the flats 38 and 40. Projections 46 on the side members are adapted for engaging the face of the magnetic frame whereby the movement portion is exactly located axially and angularly relative to the magnetic frame.

The core of the instrument is designated at 48 and it will be seen to comprise a cylindrical soft iron member having round projections 50 on the opposite ends thereof that are rotatably received in bridge elements 52 that extend transversely between the side members 44 of frame 42 to be received in the notches 54 formed therein. The ends of the bridge members are of such dimension as to fit relatively closely in the aforementioned channels that receive the side members of the frame 42 and the instrument core is thereby also located within the magnetic frame both axially and radially but on account of the round projections 50 the core is rotatable relative to the bridge members 52.

The moving coil of the instrument 56 is of a conventional type and may consist of a bobbin wound of a predetermined number of turns of wire of predetermined size and there is cemented to each end of the bobbin a pivot shaft 58 and which pivot shafts engage screws forming bearings and which screws are threaded into opposite ends of the frame.

In FIGURES 2 and 4 one of the screws is illustrated at 60 and threads through the adjacent end of the frame and has a clamp nut 62 thereon. Retained under the clamp nut on the outside of the frame is a washer 64 carrying stops 68 that limit the movement of the pointer, and another washer 70 having an end portion 72 adapted for being secured to one end of torsion spring 74 carried by the pertaining shaft 58 and having its other end bifurcated at 76 to provide for adjustment of the bias of the spring after the instrument is assembled so that the pointer can always be set exactly on zero. The pointer 14 is also carried by the aforementioned shaft 58 and is preferably provided with counterweights 78 as is well-known in the art.

The pivot screw at the opposite end of the movement is designated 80 and is likewise provided with a clamp nut and beneath the clamp nut there is carried one washer 82 having a projection 84 for connection with one end of a torsion spring 86, the other end of which is attached to shaft 58. This spring is also electrically connected with one end of the coil on bobbin 56.

Washer 82 has another projection 88 adapted for electrical connection with a terminal 90 of the instrument.

Another washer 92 mounted about screw 80 is clamped directly against the end of frame 42 and is adapted for electrical connection with a second terminal 94 of the instrument.

Washer 92 serves to complete the circuit through the coil of the instrument by virtue of being electrically connected through frame 42 with washer 70 which, in turn, is electrically connected with spring 74 and the inner end of spring 94 is electrically connected with the other end of the coil.

The washer 82 is electrically insulated by the insulating washers 96 located on opposite sides thereof and inside the aperture of the washer, all according to conventional practices.

Turning now to FIGURE 5, there is illustrated in exaggerated manner the air gap between core 48 and the pole faces 22 and 26. According to the present invention core 48 is provided with one or more portions 100 on the outer periphery thereof which modify the symmetry of the core extending lengthwise of the core which serve to vary the air gap between the pole faces and the core and thereby to vary the flux distribution about the air gap. Such portions 100 can be flats, arcuate recesses or bulges or other distortions of the core configuration. It will be evident that this core can be rotated to determine the exact manner in which the flux density is to be varied and likewise the size and location of the flats provided on the core can be varied at will such that substantially any desired control of the flux distribution about the air gap can be effected. Because of this the irregularities in the flux density in the magnetic gap due to irregular surfaces in the magnetic materials and to other factors such as variation in the coil windings, the composition of the magnetic material and the like can be compensated for to bring the instrument in such condition that its deviation from a predetermined given scale at any deflection is within a certain predetermined percentage of full scale deflection of the instrument.

Similarly, a scale of an instrument that would otherwise be non-linear can be laid out as a linear scale and the magnetic gap of the instrument adjusted, according to the present invention, so that the deflection of the instrument will be proper with regard to the linear scale.

It will also be evident that should it be desired, for any reason, to expand an instrument scale during a predetermined portion of the deflection of the pointer thereof, the present invention could be availed of for increasing the flux density in the pertaining portion of the magnetic gap whereby the greater sensitivity of the instrument would be had in the proper region but whereby also the total deflection of the instrument pointer would be within the necessary limits.

FIGURES 6 and 7 show arrangements wherein the core forms the magnet of the magnetic frame and the portion surrounding the core is of soft iron. This arrangement permits the use of an annular ring around the core and also illustrates the manner in which the modification of the magnetic gap can be regulated either by the shape of the core or by the shape of the surrounding ring.

In FIGURE 6 the magnet core 110 is provided with one or more portions 112, which may be flat or which may merely be portions having a smaller curvature than the cylindrical parts of the core and in surrounding relation to the core is a soft iron ring 114. It will be evident that the flux distribution around the magnetic gap 116 between the core and the ring can be varied by rotating the core relative to the ring. As mentioned previously, however, the core can be symmetrical and another portion of the magnetic frame be adjusted to secure the desired adjustment of the flux distribution.

In FIGURE 7 the core 118 is cylindrical and the ring 120 has one or more relieved portions 122 that serve to vary the flux density about the magnetic gap 124.

In the case of any of the modifications, once the adjustable part of the magnetic frame has been adjusted to the desired point, the adjustable part constituting either the core, or another portion of the magnetic frame forming a magnetic gap with the core, the movable portion is fixed in place by a screw or cementing, or the like, as with glyptol or lacquer, so that the relationship established in the magnetic circuit of the instrument becomes fixed and permanent.

In FIGURE 8 there is illustrated in a more or less fragmentary view the magnetic frame portion of an instrument in which the core member 130 is symmetrical so far as shape is concerned but which core is asymmetrically magnetized thereby producing a flux distribution about the air gap 132 that can be varied by rotation of the core member. In this case the core could comprise the sole magnetized element in the magnetic structure or it could be employed in combination with a magnetic frame having the usual strong Alnico magnet. The non-uniform magnetization of the core in either case would provide means for readily adjusting the flux density about the air gap by adjustment of the core on its supports.

FIGURE 9 illustrates a manner in which a core 134 could be provided with a slot 136 extending across one end thereof and with the supporting end member 138 that comprises one of the means for rotatably supporting the core being soldered or otherwise affixed to the end of the core. The slot 136 could be provided by drilling a completely formed core, if so desired, thereby eliminating the operation of soldering the end member 138 to the core body. The slot will provide for variation in the magnetic field in the region of the slot only.

FIGURE 10 illustrates an exploded perspective view showing a core consisting of the end parts 140 and 142 that have the cylindrical tenons projecting therefrom by means of which the core is rotatably supported on its bridge members. A central post 144 extends between end members 140 and 142 and is affixed thereto either by soldering or riveting and rotatable about the post 144 between the end members is another member 146 having a hole 148 through which the post passes. As will be seen in FIGURE 11, member 146 can be rotated about post 144 and thereby vary the flux distribution about the air gap.

In FIGURE 12 an arrangement similar to the one of FIGURES 10 and 11 is illustrated, but in FIGURE 12 the post 150 is located off-center in the end parts 152 and this permits the center part 154 to be so drilled for receiving post 150 that it can be moved to a position of exact concentricity with the end members. The arrangement of FIGURE 12 provides an arrangement where the entire core can be rotated as a unit or the part 154 rotated independently of the end members, and in this manner any degree of distortion of the field about the core can be obtained, and the location of the distortion about the core can also be adjusted.

In FIGURE 13 there is illustrated a core 156 which is provided with a simple saw slot 158 which may be straight or tapered from end to end thereby to provide a distorting influence that will permit adjustment of the flux distribution about the air gap.

From the foregoing it will be seen that the present invention provides a relatively simple structure and method whereby the magnetic characteristics of a moving coil type instrument along the path that the moving coil takes can be adjusted thus producing the desired response of the moving portion of the instrument to electrical stimuli whereby to cause the instrument to track any predetermined scale whether linear or nonlinear within predetermined limits. Normal manufacturing tolerances are in this manner readily and inexpensively compensated for and a better quality instrument results which can be manufactured according to closer limits of accuracy.

It will be understood that this invention is susceptible to modification in order to adapt it to different usages and conditions and, accordingly, it is desired to comprehend such modifications within this invention as may fall within the scope of the appended claims.

I claim:

1. In a moving coil type electrical indicating instrument; a fixed magnetic frame comprising a permanent magnet and having opposed arcuate pole faces, one of said pole faces being magnetically associated with each of the poles of the magnet, an instrument movement mounted in the magnetic frame between the pole faces comprising an outer frame part and a coil rotatably mounted in the frame part having side portions extending along the said pole faces, a pair of bridge elements extending between the sides of the frame part inside the ends of the coil, a core rotatably mounted in said bridge elements on the axis of said coil, said core comprising at least two parts angularly adjustable relative to each other, said parts being in end to end relation and interconnected so that movement of one relative to the other will produce changes in the flux distribution in the air gap about the circumference and along the length of the said core.

2. In a moving coil type electrical indicating instrument; a fixed magnetic frame comprising a permanent magnet and having opposed arcuate pole faces, one of said pole faces being magnetically associated with each of the poles of the magnet, an instrument movement mounted in the magnetic frame between the pole faces comprising an outer frame part and a coil rotatably mounted in the frame part having side portions extending along the said pole faces, a pair of bridge elements extending between the sides of the frame part inside the ends of said coil, a core rotatably mounted in said bridge elements on the axis of said coil, said core comprising end members angularly adjustable in the bridge members, a post extending between the end members, and a third core part on the post between the end members rotatable on the post to positions of different eccentricity relative to the end members.

3. In a moving coil type electrical indicating instrument; a fixed magnetic frame comprising a permanent magnet and having opposed arcuate pole faces, one of said pole faces being magnetically associated with each of the poles of the magnet, an instrument movement mounted in the magnetic frame between the pole faces comprising an outer frame part and a coil rotatably mounted in the frame part having side portions extending along the said pole faces, a pair of bridge elements extending between the sides of the frame part inside the ends of the coil, a core rotatably mounted in said bridge elements on the axis of said coil, said core comprising end members rotatable in the bridge elements, a post extending between the end members laterally offset from the axis of rotation of the end members in the bridge elements, a third core member between the end members rotatable about the post from a position of concentricity with the end members to various positions of eccentricity relative thereto whereby angular adjustment of the core as a unit and angular adjustment of the third core member individually relative to the end members can be availed of to vary the flux distribution about the core according to any desired pattern.

References Cited in the file of this patent

UNITED STATES PATENTS

| | | |
|---|---|---|
| 2,139,997 | Carson | Dec. 13, 1938 |
| 2,416,835 | Lingel | Mar. 4, 1947 |
| 2,547,665 | Rowell | Apr. 3, 1951 |
| 2,650,349 | Lamb | Aug. 25, 1953 |
| 2,773,240 | Young | Dec. 4, 1956 |
| 2,826,740 | Bernreuter | Mar. 11, 1958 |

FOREIGN PATENTS

| | | |
|---|---|---|
| 13,801 | Great Britain | Oct. 26, 1911 |
| 125,138 | Australia | Aug. 21, 1947 |